UNITED STATES PATENT OFFICE.

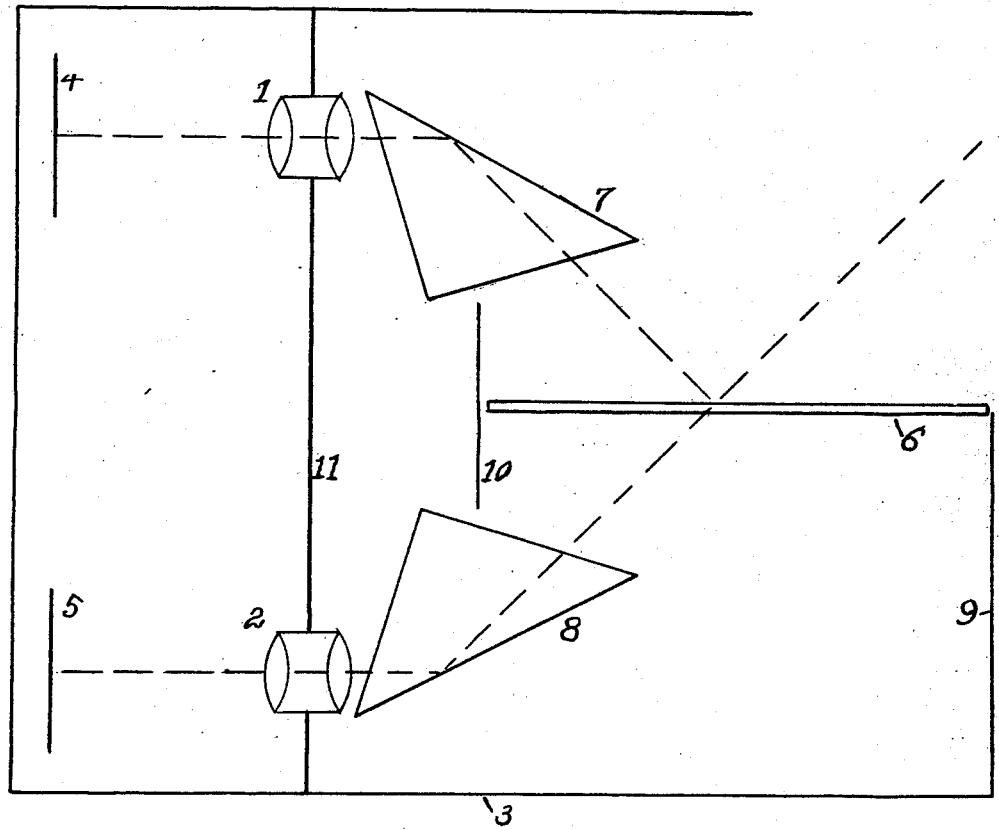

FREDERIC EUGENE IVES, OF PHILADELPHIA, PENNSYLVANIA.

PHOTOGRAPHIC APPARATUS.

1,383,543.   Specification of Letters Patent.   Patented July 5, 1921.

Application filed September 13, 1919. Serial No. 323,605.

*To all whom it may concern:*

Be it known that I, FREDERIC EUGENE IVES, a citizen of the United States, residing at Philadelphia, in the county of Philadelphia and State of Pennsylvania, have invented certain new and useful Improvements in Photographic Apparatus, of which the following is a specification, reference being had therein to the accompanying drawing.

This invention relates to photographic apparatus and is applicable either to a camera or an exhibiting apparatus. The invention has more particularly to do with cameras wherein duplicate or paired images are produced, or apparatus in which the same are exhibited, and the invention has to do with the optical devices associated with the usual lens or lenses for the purpose of dividing the entering light into a plurality of images, or blending a plurality of light beams into a single beam. The invention may have utility in various classes of machines, for example in color photography cameras, or color motion picture machines, and reference may be made for convenience to my prior Patent 1,252,964, which shows the beam of entering light divided to form a pair of images on a sensitive film or motion picture strip. The present invention may be considered in one aspect as an improvement over the optical devices of said prior patent.

An object and advantage of the present invention is that it permits the use of lenses of a greater aperture than prior devices, even as large as f. 3. 5 without cutting down either the effective aperture or the angle of full and even illumination. It also affords two images, one of which is reversed with respect to the other, although produced on the same plane, an advantage for certain purposes in relation to producing and blending the positive images in color photography.

In the accompanying drawings the single figure is a diagrammatic representation of the optical means, and may be considered as a plan view.

A pair of matched lenses 1 and 2 are shown. These are inclosed in a casing 3, shown conventionally, and behind each lens is a sensitive film or motion picture strip 4 or 5.

Coming now to the features more particularly characterizing the present invention, a transmitting reflector 6 is shown, this being preferably a plate of transparent glass which in some cases might be colored as a corrective to the transmitted rays, or might be dichroic as described in a prior patent for giving more efficient action of the primary or red and green rays.

The transmitting reflector may be considered as a light dividing or blending means. It divides the light when used as a camera, and blends the two rays for exhibiting or projecting purposes. As shown in the diagram, the transmitting reflector is set substantially at right angles to the film, or longitudinally in the apparatus, which is wholly novel in the present invention. The light enters the apparatus in a direction diagonal to the transmitting reflector, and part of the light passes through the same and part is reflected, as shown. In order to bend these two rays reflected and transmitted, a pair of devices 7 and 8 are employed, these being primarily reflectors but specifically being shown as reflecting prisms, utilizing the diagonal surface for reflecting purposes. These bending reflectors are optically located between the transmitting reflector and the film, and preferably between the transmitting reflector and the lenses, as shown.

In order to inclose the described reflecting means, the apparatus has a front extension 9 which may be shaped to give a diagonal admission of light, and within the casing are shields 10 and 11 for precluding stray light from directly or indirectly reaching the sensitive film.

It will thus be seen that I have described a photographic apparatus embodying the principles and attaining the objects of the present invention. Since various features of mere arrangement, combination and detail may be modified without departing from the principles disclosed, no limitation to such features is intended except so far as set forth in the appended claims.

What is claimed is:

1. In or for photographic exposing apparatus a pair of side-by-side matched lenses in front of the exposure plane, a longitudinal transparent reflector in front of the two lenses with its plane extending between them, and a single light blending reflector between each lens and the transparent reflector; whereby diagonally entering light rays will be reflected and transmitted to produce two images one reversed with respect to the other.

2. In or for photographic apparatus a pair of side-by-side matched lenses in front of the image plane, a longitudinal transparent reflector in front of the two lenses with its plane extending between them, and a single light bending reflector between each lens and the transparent reflector.

In testimony whereof, I have affixed my signature hereto.

FREDERIC EUGENE IVES.

---

It is hereby certified that in Letters Patent No. 1,383,543, granted July 5, 1921, upon the application of Frederic Eugene Ives, of Philadelphia, Pennsylvania, for an improvement in "Photographic Apparatus," an error appears in the printed specification requiring correction as follows: Page 1, line 109, claim 1, for the word "blending" read *bending;* and that the said Letters Patent should be read with this correction therein that the same may conform to the record of the case in the Patent Office.

Signed and sealed this 30th day of August, A. D., 1921.

[SEAL.]

KARL FENNING,
*Acting Commissioner of Patents*

Cl. 88—1.